United States Patent [19]

Moseley et al.

[11] 4,029,908

[45] June 14, 1977

[54] REPERTORY DIALER LOGIC

[75] Inventors: Robin C. Moseley, Andover; Richard A. Brisk, Arlington, both of Mass.

[73] Assignee: DASA Corporation, Andover, Mass.

[22] Filed: Nov. 24, 1975

[21] Appl. No.: 634,474

[52] U.S. Cl. .......................................... 179/90 BB
[51] Int. Cl.² ............................................ H04M 1/46
[58] Field of Search ........ 179/90 B, 90 BB, 90 BD, 179/90 CS, 2 DP

[56] References Cited

UNITED STATES PATENTS

| 3,662,118 | 5/1972 | Phoenix et al. | 179/90 B |
| 3,760,121 | 9/1973 | Nissim | 179/90 K |
| 3,860,765 | 1/1975 | McCabe et al. | 179/90 B |
| 3,920,926 | 11/1975 | Lenaert et al. | 179/90 B |
| 3,932,709 | 1/1976 | Hoff et al. | 179/90 B |
| 3,940,573 | 2/1976 | Healy et al. | 179/90 BB |
| 3,943,300 | 3/1976 | Stevenson | 179/90 B |

*Primary Examiner*—Kathleen H. Claffy
*Assistant Examiner*—Gerald L. Brigance
*Attorney, Agent, or Firm*—Weingarten, Maxham & Schurgin

[57] ABSTRACT

For use in a telephone repertory dialer in which telephone number data is stored on a magnetic recording surface, logic circuitry for entry of telephone number data onto the recording surface or for readout of data from the recording surface for dialing out a telephone number. The logic includes an electronic memory for storing a single telephone number and through which all telephone number data is conveyed for both recording and readout.

22 Claims, 15 Drawing Figures

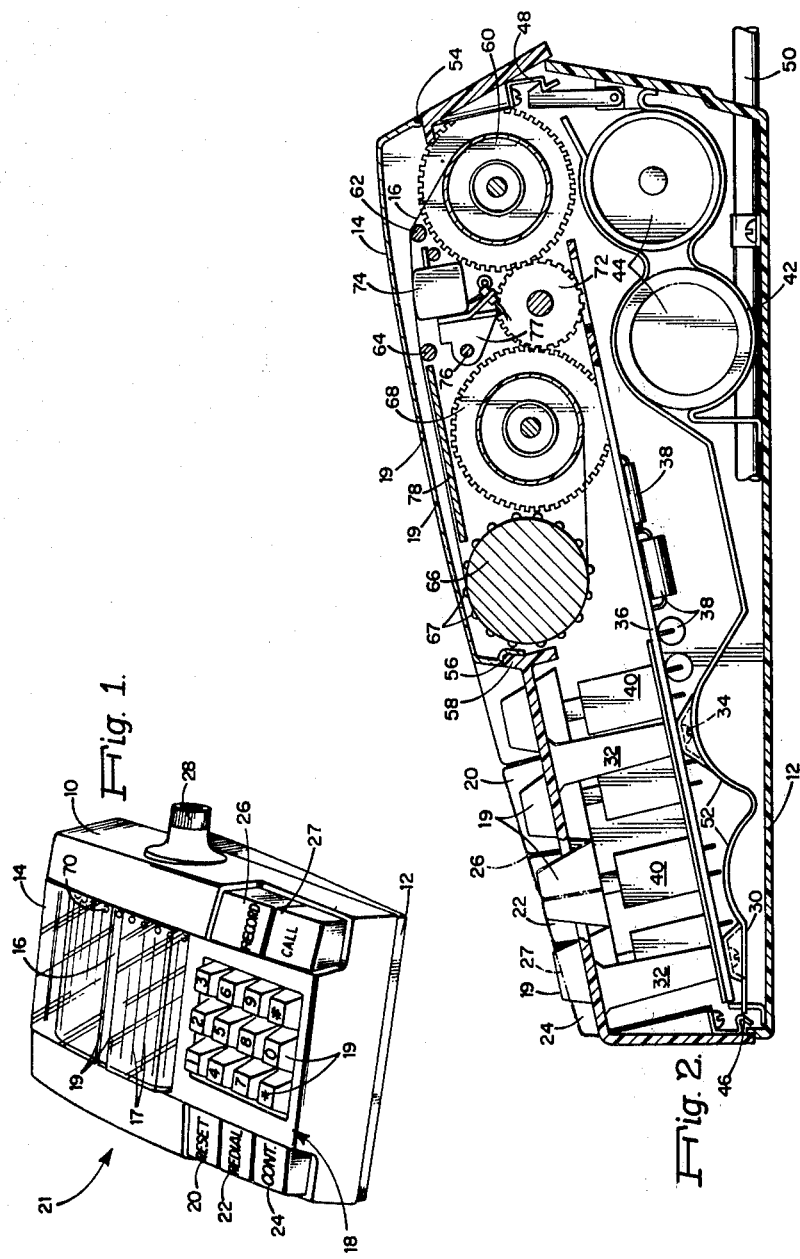

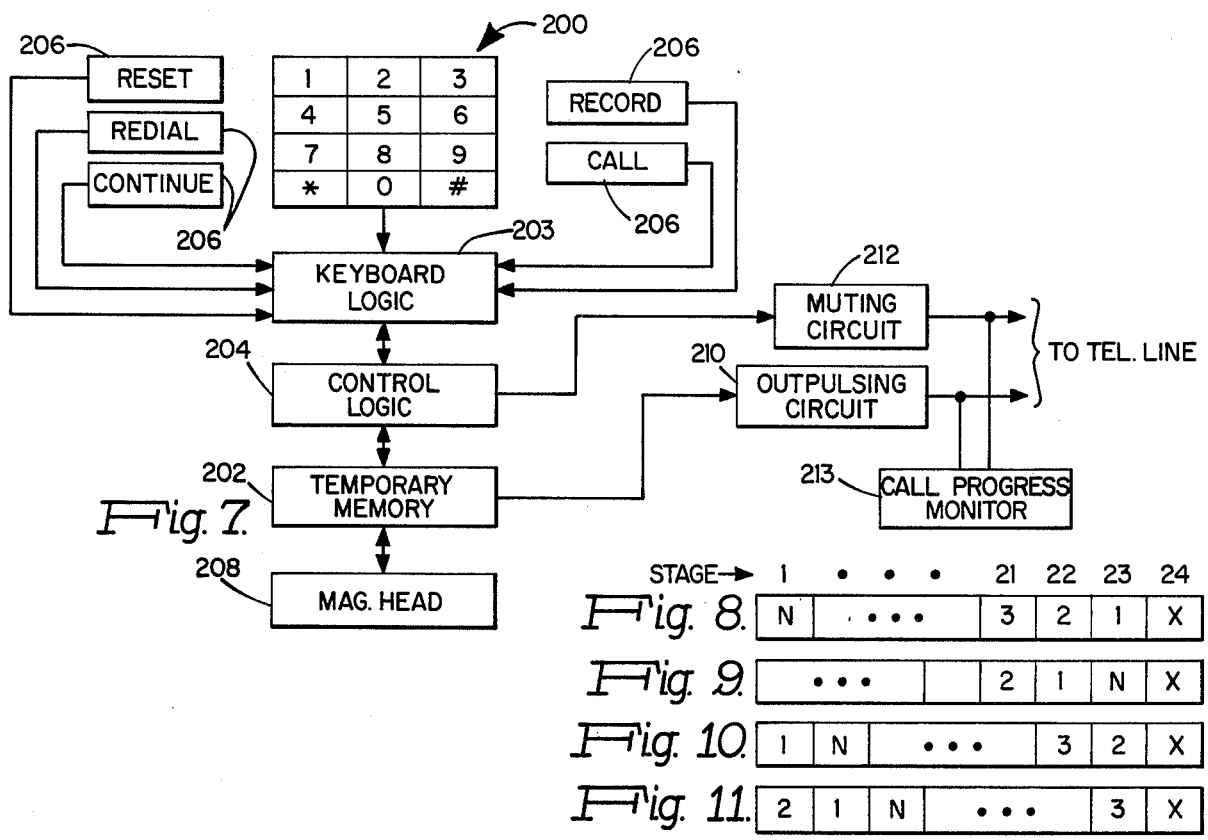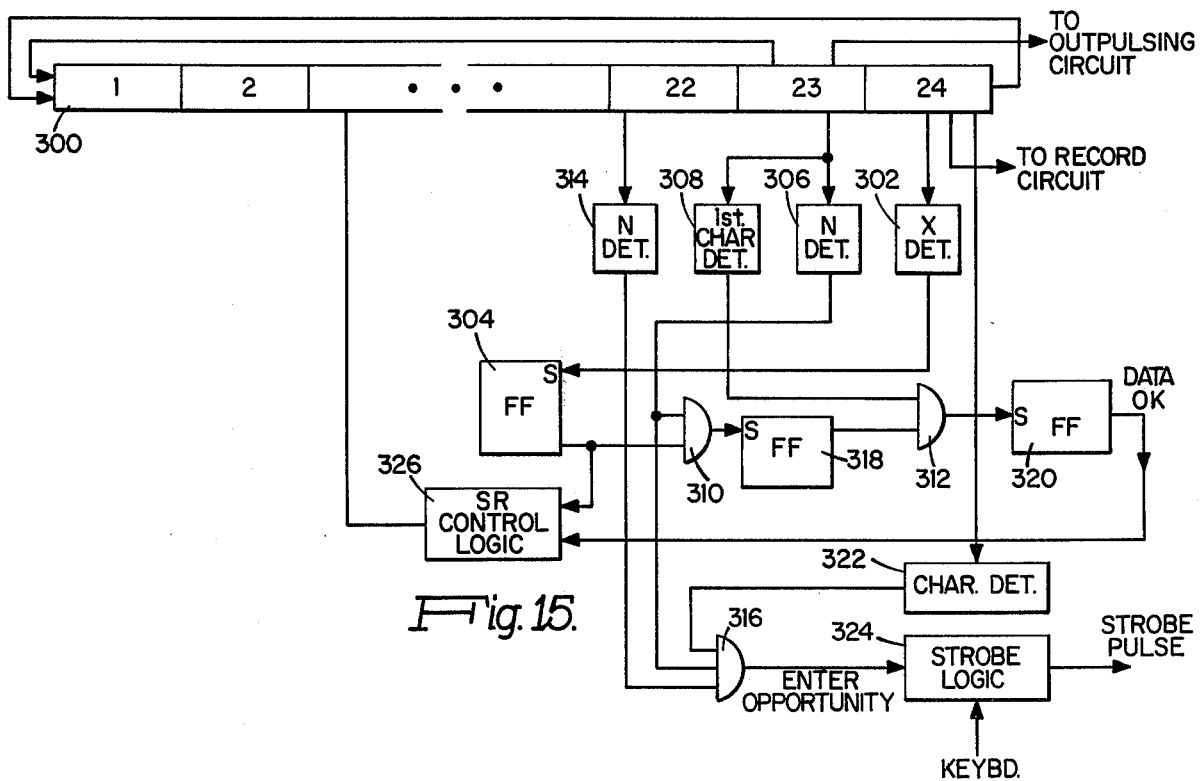

| | FF 4 | FF 3 | FF 2 | FF 1 | H1 | H2 |
|---|---|---|---|---|---|---|
| 1 | | | | 1 | 1 | 1 |
| 2 | | | 1 | | 1 | 1 |
| 3 | | | 1 | 1 | 1 | 1 |
| 4 | | 1 | | | 1 | 1 |
| 5 | | 1 | | 1 | 1 | |
| 6 | | 1 | 1 | | 1 | |
| 7 | | 1 | 1 | 1 | 1 | |
| 8 | 1 | | | | 1 | 1 |
| 9 | 1 | | | 1 | 1 | |
| 0 | 1 | | 1 | | 1 | |
| * | 1 | 1 | | 1 | | |
| # | 1 | 1 | 1 | | | |
| CONTINUE | 1 | 1 | | | | 1 |
| REDIAL | | 1 | 1 | | 1 | 1 |
| RECORD | | | 1 | 1 | | 1 |
| CALL | | | 1 | 1 | | 1 | ns
REPERTORY DIALER LOGIC

FIELD OF THE INVENTION

This invention relates to telephone repertory dialers and more particularly to a repertory dialer especially suited for home or office use and having a manually actuable mechanism mechanically operative for reading and recording telephone numbers on a magnetic storage surface and electronic circuitry for governing the storage and dialing of telephone number data.

BACKGROUND OF THE INVENTION

Telephone repertory dialers are known in which a plurality of telephone numbers are stored in a suitable data format in a storage medium for later readout of a selected number. A wellknown repertory dialer sold under the trademark MAGICALL employs an elongated web contained in a cartridge and having a magnetic recording surface for recording a plurality of telephone numbers across the width thereof in respective tracks and an opposite visibly readable surface for entering the names or numbers recorded on the magnetic surface. A magnetic transducing head is disposed in operative association with the magnetizable surface, and a motor driven mechanism is provided for longitudinally moving the web to a selected number to be dialed and to cause transport of the transducer relative to the magnetizable surface to read out the number stored therein for transmission over the telephone line. Such a dialer operates in an accurate and highly reliable manner. However, the cost of the device is governed in large part by the mechanical drive assembly which includes an accurate motor drive for transport of the tape head relative to the magnetic surface in order to provide accurate pulse information compatible with the requirements of a telephone switching system.

A telephone repertory dialer is the subject of copending application Ser. No. 486,111, filed July 5, 1974 and assigned to the assignee of this invention, which is manually actuable and mechanically operable to produce relative motion between a record/reproduction head and a magnetic recording surface for the recording and readout of telephone number data. It is an object of this invention to provide electronic circuitry especially useful with the dialer mechanism of the aforesaid copending application, although the circuitry of this invention is not limited to use with such mechanism.

SUMMARY OF THE INVENTION

Briefly, the present invention provides a telephone repertory dialer including electronic circuitry having a temporary memory for storage of a single telephone number which may be transmitted over a telephone line or recorded on the magnetic surface or both. The telephone number data is generated electronically in a precise and repeatable manner and there is no direct dependence upon mechanical motion between the transducing head and the magnetic storage surface for accurate number generation or reproduction. In a recording mode of operation, telephone number data is manually entered from a numerical keyboard or other suitable entry control and is stored in the temporary memory, and upon suitable command, such as from manual actuation of an operating button, is conveyed from the temporary memory to the magnetic head for recording on the associated magnetic surface. In a calling mode of operation, manual actuation of an operating button causes readout of the telephone number stored on the recording surface into the temporary memory and thence in an accurately timed manner governed by the associated electronic circuitry to the telephone line over which dialing signals of either pulse, tone or other suitable form are conveyed to dial a calling number.

DESCRIPTION OF THE DRAWING

The invention will be more fully understood from the following detailed description taken in conjunction with the accompanying drawing in which:

FIG. 1 is a pictorial view of an automatic repertory dialer of the type embodying the invention;

FIG. 2 is a sectional elevation view of the dialer of FIG. 1;

FIG. 7 is a diagrammatic representation of the dialer circuitry according to the invention;

FIGS. 8, 9, 10 and 11 are diagrammatic representations of data formats useful in explaining operation of certain features of the invention;

FIG. 15 is a diagrammatic representation of shift register logic according to the invention.

DETAILED DESCRIPTION OF THE INVENTION

Figure 3:
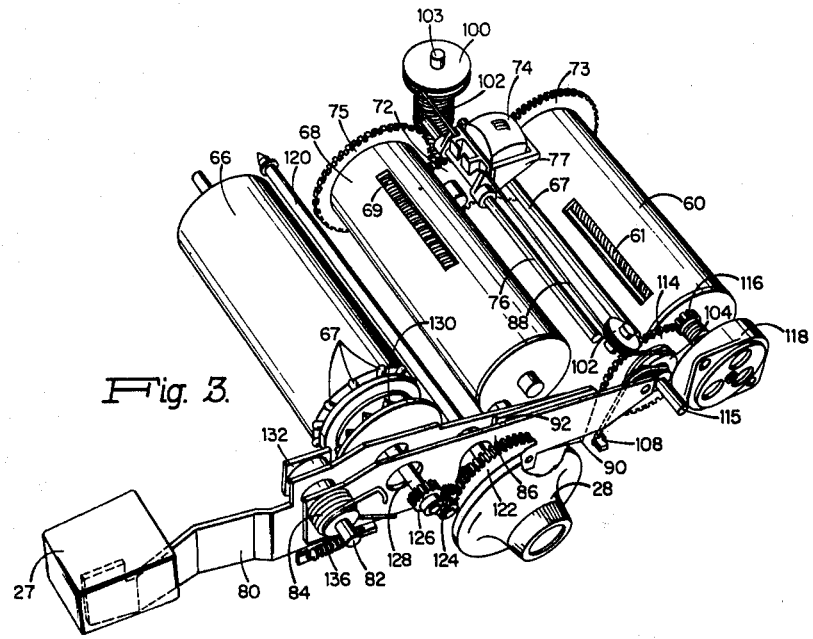
FIG. 3 is a cutaway pictorial view of the major mechanical structure of the dialer of FIG. 1.

The invention is shown in its external aspect of FIG. 1. The novel telephone repertory dialer is contained within a housing 10 affixed to base plate 12 and which includes electronic circuitry for storing a representation of a telephone number, together with associated controls for accomplishing the recording and dialing of telephone numbers. The housing includes a transparent cover 14 beneath which is a portion of an elongated tape 16 which includes a writing surface visible in FIG. 1, having lines 17 thereacross defining areas for entering the names of called parties, the telephone numbers of which are recorded on an opposite surface of the tape. The opposite surface of tape 16, not visible in FIG. 1, is of magnetizable material for magnetically recording signals thereon representing telephone numbers and which are recorded by means of a known magnetic recording head. The cover 14 can be raised for access to the writing surface of tape 16 for entry of called party names thereon.

A keyboard 18 is provided on housing 10 having individual push button 19 for actuation of switches corresponding to the numerals 0 - 9 and special functions. The housing 10 also includes control buttons 20, 22, 24, 26 and 27 labeled respectively, reset, radial, continue, record and call for governing operation of the dialer for recording and reading out telephone numbers. A manually rotatable knob 28 extends from one side of housing 10, the knob being coupled to the transport mechanism on which tape 16 is wound, and by which the position of tape 16 is controlled to select a particular telephone number for dialing, or a particular area of the tape for recording of a number thereon.

The dialer mechanism is shown in FIGS. 2–6. The general arrangement of the mechanism and associated electronic circuitry within housing 10 is depicted in FIG. 2, and includes a bracket 30 secured to housing 10 by appropriate means such as housing flanges 32 and fasteners 34. A printed circuit board 36 is attached to bracket 30 as shown, the circuit board containing circuit components 38 comprising the electronic circuitry associated with the dialer mechanism. The circuit board also has mounted thereon the switches associated with the operating control buttons, such as switch 40 illustrated in FIG. 2. A bracket 42 is affixed to base plate 12 and is configured cooperatively with the confronting portion of bracket 30 to retain a pair of batteries 44 therebetween. The base plate 12 is detachably affixed to housing 10 by means of front and rear latches 46 and 48 respectively. The latches may be of the spring type as illustrated, or of any other suitable type to retain the housing and base plate in engagement. The base plate also has secured therein a cable 50 for interconnecting the dialer to a telephone line.

The novel dialer in the mechanical configuration illustrated is adapted for either table-top or wall-mounted use. The dialer depicted in FIG. 2 is arranged for table-top use and provides a downwardly sloping top surface for ready visibility and ease of operator usage. Wall mounting is accomplished by rotating base plate 12 by 180° from the position shown in FIG. 2, such that rounded portions 52 of bracket 30 mate with bracket 42 to retain batteries 44, and in which disposition the front surface of housing 10 slopes downward and outward from a mounting wall for ease of visibility and use. It will be appreciated that the dialer can be contained within different housing configurations suitable to particular requirements and need not employ the mounting apparatus illustrated.

Cover 14 is pivotally attached to housing 10 by means of pin 54 at the rearward end thereof, and the cover is retained in a closed position by means of a lip portion 56 at the forward end thereof engaging a cooperative ridge 58 of the housing. The tape 16 is wound on a tape spool 60 and extends over guide rollers 62 and 64 around a sprocket wheel 66 and thence to a second tape spool 68. The tape includes an array of sprocket holes 70 along one edge thereof, as seen in FIG. 1, which cooperate with the sprocket teeth 67 of wheel 66 for driving the tape forward and backward along its travel path in response to rotation of knob 28. An idler wheel 72 is in meshing relationship with the geared flanges 73 and 75 of tape spools 60 and 68. A magnetic head 74 is disposed adjacent the magnetizable surface of tape 16 at a position between guide rollers 62 and 64, the head being affixed to a mounting assembly 77 linearly movable along a rod 76 for relative scanning of the recording surface. A plate 78 is disposed adjacent the recording surface of tape 16 in a position illustrated to serve a platen against which the tape is urged when writing called party names on the writing surface of the tape.

As best shown in FIG. 3, tape spools 60 and 68 include respective springs 61 and 69 therein for biasing the spools in opposite directions to maintain tension on tape 16 wound thereon. In the embodiment as illustrated in FIG. 3, spool 60 is biased in a clockwise direction while spool 68 is biased counterclockwise. The tape transport mechanism is manually controlled by means of knob 28 and upon forward or reverse rotation of knob 28, sprocket wheel 66 is driven correspondingly by means of meshed gears 122, 124 and 126. Tape 16 is driven by sprocket teeth 67 with spools 60 and 68 being rotatable accordingly to accommodate the tape motion. The tape spools 60 and 68 are in meshing relationship by means of gears 73, 72 and 75 to rotate in synchronism in response to tape motion.

Referring now to FIGS. 3–6, a lever 80 has an end to which record/dial button 27 is affixed and by which the recording or dialing of telephone number information is accomplished. Arm 80 is pivotally movable on pin 82 and has a rearward portion which is biased downward by means of a spring 84 mounted around pin 82. An idler lever 86 is disposed generally parallel to arm 80 and has a forward end pivoted to pin 82 and a rearward end engaging flexible cord 88 by means of pulley 106 rotatably affixed at the rearward end thereof. Latch 90 is pivoted to lever arm 80 by means of a pin 92 and includes a hook 94 which engages a pin 96 affixed to arm 86. A bias spring 200 urges the latch into engagement with pin 96. A stop member 98 is mounted to the mechanism support structure for engagement of the confronting end of latch 90 to cause disengagement of hook 94 from pin 96 when latch 90 reaches the uppermost point of travel.

Figure 4:
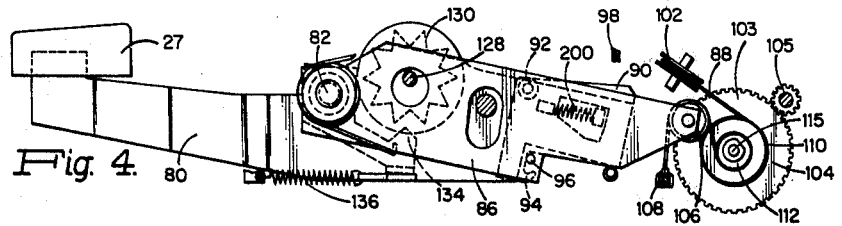
FIGS. 4, 5 and 6 are elevation views of the dialer structure illustrating the operation thereof.
Figure 5:
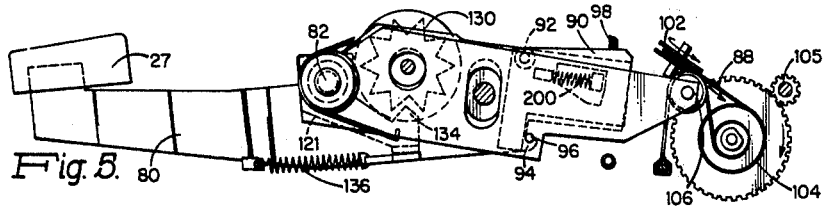
Figure 6:
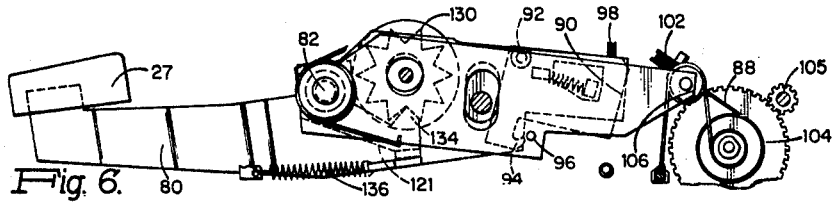

Cord 88 to which magnetic head 74 is coupled extends across the dialer mechanism between pulleys 100 and 102. An end of cord 88 is affixed to pulley 100 which is coupled to a biasing means 102, such as a spring around the shaft 103 of pulley 100, operative to urge cord 88 and magnetic head 74 coupled thereto to its rest or home position, illustrated in FIG. 3. From pulley 102, cord 88 passes around pulleys 104 and 106 and is anchored to a pin 108 mounted to the support structure. Pulley 104 has grooves of different diameters about both of which cord 88 is wound. As best seen in FIGS. 4–6, cord 88 is disposed around larger portion 110 of pulley 104 and thence around smaller portion 112.

As seen in FIG. 3, gear wheel 114 is affixed to pulley 104 and is rotatable therewith on a common shaft 115. Gear 114 meshes with gear 116 which is supported by a shaft to which shaft is coupled to a governor 118. Knob 28 is connected to shaft 120 also carrying gear 122 disposed adjacent knob 28. Gear 122 is coupled by gear 124 to gear 126 mounted to shaft 128 to which is secured sprocket wheel 66 and star wheel 130. An arm 132 is pivotally affixed to pin 82 and has a pawl 134 engageable with the notches defined by the adjacent teeth of star wheel 130. Arm 132 is biased such as by an over-center spring (not shown). In one position, as depicted in FIG. 4, pawl 134 is disengaged from the star wheel when arm 80 is in its uppermost position. In a second position, illustrated in FIG. 5, pawl 134 is disposed between the teeth of star wheel 130 but not fully engaging the teeth, this position occurring at an intermediate downward position of arm 80. Upon additional downward movement of arm 80, the over-center spring causes pawl 134 to snap into engagement with star wheel 130, as shown in FIG. 6. In this latter position, the star wheel and the sprocket wheel 66 coupled thereto, is positively positioned to remain in predetermined position such that upon full depression of arm 80 to cause dialer operation, the tape 16 remains in fixed position. A spring 136 urges arm 80 to its normal raised position.

Upon rotation of knob 28, the star wheel 130 is correspondingly moved causing pawl 134 to be urged outward by an amount sufficient to cause the over-center spring to urge the pawl out of engagement with the star wheel to permit free rotation of sprocket wheel 66 and tape 16 supported therearound.

For dial operation, call button 27 is manually depressed to cause movement of magnetic head 74 to a position at the opposite edge of tape 16, after which the magnetic head is caused to return its home position at a controlled rate for recording telephone number data onto the recording surface of tape 16 or for reading out number data previously recorded thereon. Upon depression of arm 80 by operating button 27, the rearward portion of arm 80 moves upward also raising arm 86 and pulley 106 carried thereby. Upward movement of pulley 106 causes rotation of pulley 104 which in turn draws cord 88 and magnetic head 74 to a start position, which is the opposite from that shown in FIG. 3. When the rearward portion of arm 80 and arm 86 reach the uppermost portion of their travel, latch 90 engages stop 98 causing disengagement of hook 94 from pin 96, as shown in FIG. 6. Such disengagement of pin 96 causes arm 86 and pulley 106 to drop downward releasing the restraining force on cord 88 and causing the cord to retract by action of biased pulley 100, and causing corresponding return of magnetic head 74 to the home position. By means of mechanical amplification provided by two-diameter pulley 104, a greater travel extent is provided for magnetic head 74 in response to a lesser travel extent of the rearward portion of arm 80. Return motion of magnetic head 74 is controlled by governor 118 coupled via gears 114 and 116 by pulley 104 to provide accurate and uniform return motion of the magnetic head for magnetic recording and readout purposes.

To employ the novel dialer for recording a telephone number on tape 16, the tape is manually conveyed by means of control knob 28 to a position at which a number is to be entered. The tape includes reference lines 17 across the visual writing surface to define transverse areas in which the name or other indication of the recorded number is written. The area at which an entry is to be made is visually aligned with the reference lines 19 provided across the width of cover 14. After alignment of the area in which a number is to be entered, cover 14 is raised and the identifying information writted into the defined area. Platen 78 disposed beneath tape 16 in a position adjacent the recording surface serves as a backing member to permit the writing of data onto the visual tape surface.

To record a magnetic representation of a telephone number, the number is selected by means of keyboard 19 and entered by record button 26 into an electronic memory which is part of the circuitry associated with the dialer. The call button 27 is depressed to cause movement of magnetic head 74 to a start position, as described above, and controlled transport of the magnetic head across the magnetic recording surface of tape 16 back to a home position. During such controlled movement of head 74 across the recording surface of tape 16, telephone number data derived from the number data in memory is provided to head 74 for the recording of the number data onto the recording surface. A telephone number is thereby stored along a predetermined transverse area of tape 16 for later use. Other telephone numbers are similarly recorded on respective transverse areas of tape 16, and corresponding visual identification of such telephone numbers similarly entered onto the corresponding transverse areas of the visual surface of tape 16.

It is contemplated that telephone number data can be recorded on tape 16 in areas across the tape width which are transverse or generally transverse to the longitudinal axis of the tape depending upon the specific path of motion of heat 74 relative to tape 16. In the embodiment shown, head 74 is caused to move in a linear substantially transverse path across the tape. In alternative implementation, the head can be caused to move in a skewed or arcuate path across the tape width as determined by the particular mechanism employed.

To dial a number recorded on tape 16, the number to be dialed is selected by rotation of knob 28 to a position aligning the visual indication of the intended number within the reference lines 19 on cover 14, at which position the corresponding recorded data on the recording surface of tape 16 is generally aligned with the magnetic head 74. Precise alignment between the magnetic head and the recorded area is achieved by operation of the star wheel mechanism described above. Upon depression of call button 27, magnetic head 74 is again caused to move to a start position and then to return to its home position at a controlled rate during which return movement the recorded telephone number data is sensed by the head 74 to provide electrical signals representative of the recorded data which signals are conveyed to the electronic memory of the associated circuitry for temporary storage of the sensed telephone number data. The telephone number data stored in electronic memory is then read out and applied to a telephone line for transmission to complete the call.

The logic of the repertory dialer is shown broadly in FIG. 7. A manually actuable keyboard 200 is coupled to a temporary memory 202, typically a shift register memory, and which in turn is coupled to keyboard logic 203 and thence to control logic 204. Control buttons 206 labeled record, call, reset, redial and continue are also coupled to keyboard logic 203. The temporary memory 202 is coupled to a magnetic recording-reproduction head 208 which is associated and cooperative with the magnetic recording surface of the tape which is part of the dialer assembly described hereinabove. Memory 202 is also coupled to an outpulsing circuit 210 which is adapted for coupling to a telephone line for application of dialing signals of either pulse or tone form. A muting circuit 212 is also adapted for coupling to the telephone line and is controlled by logic 204 to mute the earpiece of the associated telephone set during dial out of calling information. A call progress monitor 213, which typically is a loudspeaker, can be connected across the dialer output to monitor dialer operation. The keyboard 200 includes buttons representing the digits 0—9, as well as special function keys labled * and No. Such special function keys are optional and in a pulse dialer are not usually employed. The dialer logic is typically implemented in integrated circuit form and requires very little power for operation. Power can be provided by any suitable source, including batteries or an appropriately regulated power supply energized by an AC line. The circuitry is maintained in a quiescent or standby condition with power provided to the circuitry but with no logical operation occurring until required. Operation of the circuitry can be commenced by actuation of any key of keyboard 10 or by operation of the redial or call buttons.

In order to record a telephone number onto the magnetic tape for entry into the repertory of stored numbers, the intended number is entered by means of keyboard 200 into memory 202 for temporary storage. The record button is then actuated to enable the recording mode and the call button is thereafter depressed to cause operation of the mechanism described above to move magnetic head 208 relative to the magnetic tape and thereby record the number stored in memory 202 onto the selected track of the tape. The control logic 204 includes timing circuitry for governing system operation. Preferably, the record button and thereafter the call button must be actuated within a predetermined time sequence after manual entry of the number into memory 202 in order to permit recording of the number on tape and to prevent inadvertent recording of data. After such predetermined time has elapsed, actuation of the record button is ineffective and thus minimizes the possiblity of erroneous erasure of data on tape by transferring data from memory 202 by inadvertent button actuation. Upon entry of a telephone number from keyboard 200 to memory 202 the number is also conveyed from the memory to outpulsing circuit 210 for the dialing out of the telephone number.

The dialer can be connected to the telephone line on either the telephone side of the hook switch or the line side of the hook switch. If the dialer is connected to the telephone side of the hook switch, the telephone receiver must be lifted to provide an off-hook condition for dial-out of a telephone number over the line. If the dialer is connected to the line side of the hook switch, dial-out of a number over the telephone line can be accomplished even though the receiver remains on-hook. The call progress monitor 213 is especially useful when the dialer is conveying a telephone number over the telephone line with the receiver on-hook. Ringing and busy signals are aurally monitored, such that the receiver can be lifted by a user only if the call goes through.

For automatic dialing of a telephone number previously stored on the magnetic tape, the tape is appropriately aligned for the selected number, as described above, and the call button is actuated to cause operation of the dialer mechanism and reading of the number from the tape by head 208 into memory 202 and thence via circuit 21 to the telephone line. The data stored in memory 202 remains in storage until new data is entered therein.

The dialer can be employed to dial a number from the keyboard 200 or from the magnetic tape. Upon actuation of the redial button, the telephone number data in memory 202, which has been entered from keyboard 200 or the magnetic tape, is conveyed to outpulsing circuit 210 and thence over the telephone line. In the event that a call is not completed, the call can be redialed by again actuating the redial button. The continue button is employed in dialing out telephone numbers employing access codes. In the event that a continue code has been recorded on tape along with the telephone number, the dialing-out sequence will stop upon detection of the continue code, and dialing-out will continue upon actuation of the continue button.

The data format of the telephone number data stored in memory 202 comprise 96 bits of 24 four bit characters. Included within the 24 character format is an X marker character which denotes the beginning of the data block representing a telephone number and at least one null character N which denotes the end of the data block. In the illustrated embodiment, the marker character is 1111, while the null character is 0000. The telephone number defined by the data block is thereby readily ascertained to assure recording and transmission of a telephone number in the appropriate digit sequence. Data is shifted serially into the shift register memory and in certain events can exist in the shift register in an incorrectly ordered character sequence. The sequence must be correctly reordered for correct recording or dialing of the stored telephone number. The shift register memory is operative to recirculate data in the last or next to last character stage, such that data can be recycled through the memory upon appropriate command.

A correctly ordered telephone number stored in the shift register memory is illustrated in FIG. 8, wherein the X marker character is present as the initial character followed by the digits of the stored telephone number, with the null character N being present as the last character of the stored data block. In the event that less than 22 digits are stored, additional null characters will be present in the remaining stages of the shift register.

In order to detect the presence of a correctly ordered telephone number data within the shift register, data in stage 24 of the register is rotated to stage 1 until the X marker is detected in stage 24. Data is then rotated from register stage 23 until the null character N is detected in stage 23, as shown in FIG. 9. Data is again rotated from stage 23 until the first digit character (not N or X) is detected in stage 23, this condition being represented in FIG. 8. The shift register is operated in a recirculatory manner and as data is rotated from stages 23 or 24, data in the previous stages is advanced through the register. At this point, a correctly ordered telephone number is present in the shift register for dialing out.

In the record mode of operation, a correctly ordered telephone number is conveyed from the shift register to a record circuit for storage of this number on the recording surface of the magnetic tape. The recording circuit itself is not shown since it is per se of well known construction and operation for converting data received from the shift register to a signal form suitable for magnetic recording. Preferably, the telephone number is recorded on the magnetic recording surface as a biphase selfclocking code. In the record data is clocked out of stage 24 of the shift register to record the correctly ordered telephone number including the X and N marker characters onto the recording surface. The X marker in stage 24 is initially clocked out for recording the tape and is recirculated to stage 1 of the register, while the data in stages 2 through 22 is shifted by one stage. The digit now present in stage 24, which is the first number digit of the stored telephone number, is conveyed from stage 24 to the record circuit and is also recirculated to stage 1 of the register, the data in stages 2 through 22 being again shifted. Conveyance of data from the register continues in like manner for each succeeding digit or special character of the stored telephone number. Shifting of the register continues for the remaining register positions containing null characters. Upon the completion of this shifting operation, the dialer reverts to a quiescent condition. The data thus recorded on tape includes the X marker, the telephone number and N markers for a total of 96 bits or 24 characters.

In the call mode of operation, data from the keyboard or the tape is recirculated at a selected rate through the shift register and at predetermined readout times data is read from stage 23 of the shift register. Thus data is read from the shift register while recirculation continues through the register. Data is recirculated an integral number of times such that a predetermined readout time stage 23 will contain the correct digit to be read out. Successive characters are thereby read from the shift register to the outpulsing circuit until a null character N is detected in stage 23 simultaneously with an X character in stage 24. The shift register format just prior to calling of a stored telephone number is as shown in FIG. 8. Digit one in stage 23 is then clocked out to the outpulsing circuit and the data in the shift continues to recirculate therethrough. At the next readout time the second digit now in stage 23, as shown in FIG. 10, is clocked out. Recirculation continues and at the next readout time digit three which is now in stage 23, as depicted in FIG. 11, is clocked out. Recirculation of data through the register and clocking out of each successive digit of the stored telephone number continues in like manner until an entire telephone number has been read out. The detection of an N character in stage 23 and an X character in stage 24, as shown in FIG. 9, signals the end of a readout or calling sequence.

Figure 12:
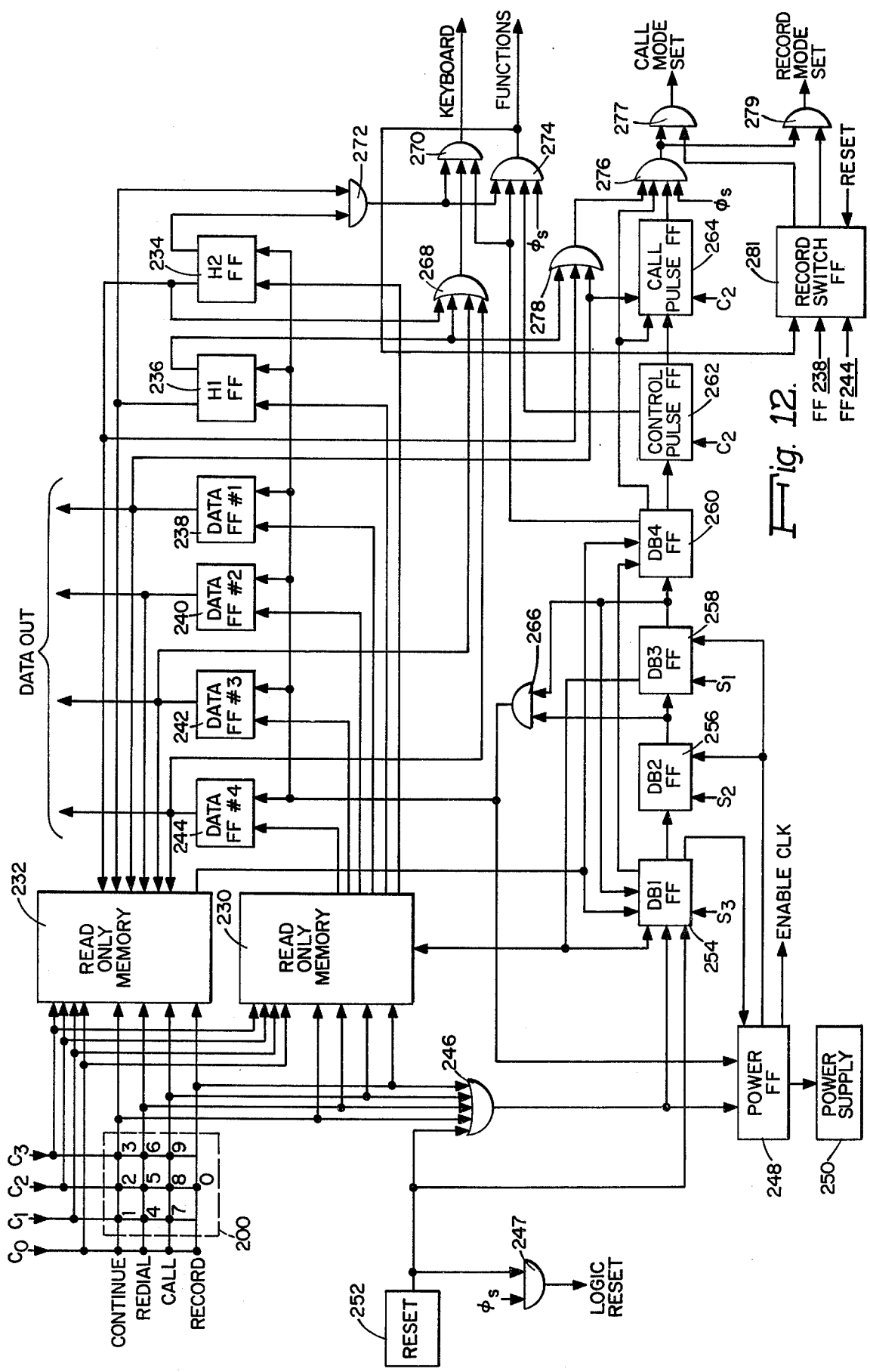
FIG. 12 is a diagrammatic representation of data entry logic according to the invention.
Figures 13, 14:
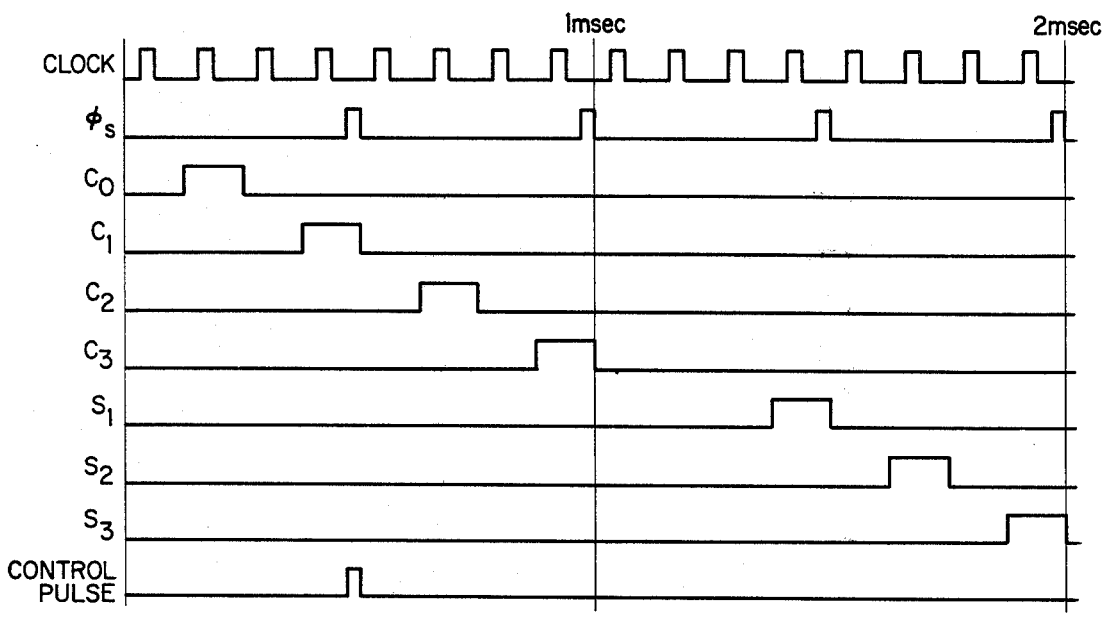
FIG. 13 is a timing diagram useful in illustrating operation of the logic of FIG. 12.
FIG. 14 is a table illustrating the keyboard and control switch codes of the logic of FIG. 13.

The operation of the keyboard logic will be described in conjunction with FIG. 12 and the timing diagram of FIG. 13. Referring to FIG. 12, it is seen that the keyboard 200 and the control buttons are arranged in a matrix configuration and are coupled to the inputs of read-only memories 230 and 232. Memory 230 has its outputs respectively coupled to data and control flip-flops 234–244. The outputs of these flip-flops are applied to inputs of read-only memory 232. The row outputs of the keyboard and control button matrix are coupled via an OR gate 246 to a power flip-flop 248 which enables the system clock and which may also enable power supply 250 to apply energizing power to portions of the system as required.

A reset button 252 is also coupled to OR gate 246 and to an input of DB1 flip-flop 254, an input of which is also provided by OR gate 246. The reset button is also coupled to an AND gate 247 which also receives a $\phi_s$ clock signal to produce a logic reset signal upon actuation of button 252. The power flip-flop 248 provides output signals to the DB2 and DB3 flip-flops 256 and 258 and receives a signal from the DB1 flip-flop 254. The output of the DB2 and DB3 flip-flops are coupled via an AND gate 266 to the data and control flip-flops 234–244. An output from read-only memory 232 is applied to the DB4 flip-flop and the DB1 flip-flop. The outputs of flip-flops 234, 236, 242 and 244 are coupled to an AND gate 268, the output of which is applied to an AND gate 270 which receives a second input from the DB4 flip-flop and a third input from an AND gate 272 which receives input signals from flip-flops 234 and 236. The AND gate 270 provides an output signal level denoting that a keyboard or control switch entry is present. A function code is provided by AND gate 274 which receives input signals from gate 272, DB4 flip-flop 260, control pulse flip-flop 262 and the $\phi_s$ clock. An AND gate 276 receives input signals from gate 278, the DB4 flip-flop, the call pulse flip-flop 264 and the $\phi_s$ clock. Gate 276 is coupled to AND gates 277 and 279 which also receive inputs from record switch flip-flop 281. Flip-flop 281 receives input signals from gate 274 and data flip-flops 238 and 244, as well as a reset signal such as from the power flip-flop 248. Gate 277 provides a call mode set command to enable the calling mode. Gate 279 provides a record mode set command to enable the recording mode.

In the quiescent or standby condition, the power flip-flop 248 remains disabled and thus no energizing power is applied to associated components such as the read amplifier which consumes significant power. Flip-flop 281 is held reset by the power flip-flop in this quiescent condition. Upon actuation of any of the keyboard or control switches, a row signal from the switch matrix is provided via gate 246 to set the power flip-flop 248 and thereby enable the system clock and energize the associated components requiring energization. The DB1 flip-flop is set by the signal from OR gate 246. The timing sequence commences upon setting of flip-flop 248, and the timing circuitry provides non-overlapping column strobe pulses $C_0$ through $C_3$ which are applied to the column lines of the switch matrix and to read only memory 230 and clock pulses $S_1$ through $S_3$ which are respectively applied to flip-flops DB3, DB2 and DB1. The DB1 flip-flop causes the setting of the DB2 flip-flop upon the occurrence of the next $S_2$ clock pulse. This DB2 flip-flop provides, via gate 266, a reset signal to the control and data flip-flips 234–244, which reset signal is removed from the setting of the DB2 flip-flop.

The maintenance of flip-flops 234–244 in a reset state until the setting of the DB2 flip-flop prevents the spurious setting of the data and control flip-flops by reason of starting transient contact bounce noise and other spurious conditions. The control and data flip-flops are set according to the output condition from read-only memory 230, which code is determined in accordance with the particular keyboard or control switch acutated. The switch codes are depicted in FIG. 14 and are set to be a 3-out-of-6 code, with the exception of the record switch which is a 2-out-of-6 code for reasons to be presently described. The DB1 flip-flop is reset upon the occurrence of the next $S_3$ clock pulse, and if, during the next timing cycle the input from the switch matrix is still present, the DB1 flip-flop is again set by the signal from the OR gate 246. With flip-flop DB1 and DB2 both set, the DB3 is set during the occurrence of the $S_1$ clock pulse. The setting of the DB3 flip-flop disables read-only memory 230.

The switch code is also provided to read-only memory 232 which also receives an output code provided by flip-flops 234–244. The read-only memory 232 is operative to compare the input switch data with the data stored by flip-flops 234–244 to verify that the proper code has been stored for subsequent processing, and to verify that only a single actuating switch has been depressed. If the code stored in flip-flops 234–244 corresponds to the key code provided by the switch matrix, memory 232 provides an output signal to flip-flop DB4 which provides a keyboard signal via gate 270 or a control pulse via gate 274, according to the state of the control flip-flops 234 and 236.

During the next received pulse, memory 232 provides an output signal to set flip-flop DB4. The data flip-flops 238–244 provide the binary code for the actuated keyboard switch. The setting of control flip-flop 234 and the non-setting of control flip-flop 236 denotes the actuation of a control switch. Any other code combination from control flip-flops 234 and 236 denotes the actuation of the keyboard switch. The setting of the DB4 flip-flop following the actuation of a keyboard switch causes generation of a keyboard signal by gate 270 for so long as the key is depressed. If the setting of the DB4 flip-flop is caused by closure of a control switch, a control pulse is provided at the occurrence of the next $\phi_s$ pulse by gate 274. At the next $C_2$ pulse, flip-flop 262 is set disabling gate 274 and preventing further provision of control pulses. Thus, only a single control pulse is produced for each control key actuation.

In the event that the closure of the call switch is recognized by the circuitry described above, a call mode pulse will be generated by gates 272 and 276. Gate 277 is enabled by the continued reset condition of record switch flip-flop 281. If closure of the record switch is recognized, record switch flip-flop 281 will be set, disabling gate 277 and enabling gate 279. Subsequent closure of the call switch will cause a record mode set pulse to be generated via gate 279. Closure of the record switch causes flip-flops 240 and 234 to be set. If the record switch remains closed and during this closure the call switch is also closed, flip-flop 238 will also be set generating a record mode set pulse. Thus, the use of a 2-out-of-6 code for the record switch, together with a 3-out-of-6 code for the call switch enables recognition of the simultaneous closure of the record and call switches. This is an exception to the usual operation of the decoding circuitry which will not otherwise recognize simultaneous contact closure of the keyboard switches.

In the event that a signal from the switch matrix is received by reason of a contact bounce present by noise, the flip-flop 248 is set as is the DB1 flip-flop. The setting of the DB1 flip-flop causes setting of the DB2 flip-flop, and upon occurrence of the next $S_3$ pulse, the DB1 flip-flop is reset. If during the next timing cycle the spurious input is not present, the DB1 flip-flop remains reset, and upon occurrence of the next $S_1$ pulse, the DB3 flip-flop is reset causing the resetting of flip-flop 248 and flip-flops 234 through 244, thereby returning the logic to its quiescent state.

During each strobe cycle, the DB1 flip-flop is set and reset, and upon release of a key or control switch, the DB1 flip-flop remains reset and the DB2 is reset upon occurrence of the next $S_2$ pulse. The resetting of the DB1 and DB2 flip-flops causes the resetting of the DB3 flip-flop upon occurrence of the next $S_1$ pulse, which in turn causes resetting of flip-flop DB4 and flip-flops 262 and 264. If the switch recloses within the cycle time of two milliseconds, the DB1 flip-flop is set during the next cycle thereby enabling the subsequent setting of the DB2 flip-flop. Thus, the DB3 flip-flop remains set unless the opening of the switch extends for at least two adjacent two millisecond cycle times.

The keyboard and control switches of the present dialer are cooperative with the associated keyboard logic to provide recognition of keyboard and control data only when a single switch is actuated for a predetermined time, typically 4–6 milliseconds. If more than one key or control switch is actuated simultaneously, the flip-flops DB1, DB2 and DB3 will be set in the manner described above. However, an erroneous switch code will be provided and stored in the data and control flip-flops 234–244, and read-only memory 232 will not provide an output signal to the DB4 flip-flop, as the incorrect switch data will not be correlated by the read-only memory. In the event that a second or additional key or control switch is actuated after an initial signal switch actuation, closure of the further switch will not be recognized once the initial switch has been recognized for subsequent processing. If a second key or control switch is actuated after provision of a signal to read-only memory 230 by DB3 flip-flop 258, signifying recognition of a first actuated switch, the second switch closure will be decoded upon release of the first actuated switch provided that the second switch remains actuated for the predetermined minimum time.

Actuation of the reset button during logic operation causes generation of a reset pulse via AND gate 247 at the next occurrence of the $\phi_S$ pulse to thereby reset the logic and a return to its quiescent state. Resetting is accomplished at the time of occurrence of the $\phi_S$ pulse, such that data recirculation is stopped with the data being properly disposed in the storage cells of the shift register.

The operation of the shift register logic is illustrated in FIG. 15. The shift register 300 corresponds to temporary memory 202 of FIG. 7 and is a 24-stage shift register with each stage being operative to store 4-bit characters. The register is operative to selectively transfer data from either stage 23 or stage 24 to stage 1 upon appropriate command. Stage 23 has an output coupled to outpulsing circuit 210 (FIG. 7) for readout of telephone numbers from the shift register when such data is in a correctly ordered sequence within the shift register. Stage 24 is connected to an X character detector 302, the output of which is connected to a flip-flop 304. Stage 23 is coupled to an N (null) character detector 306 and to a first character detector 308, the outputs of which are respectively applied to AND gates 310 and 312. Stage 23 is connected to an N character detector 314, the output of which is applied to an input of an AND gate 316. The flip-flop 304 provides an input to AND gate 310 which provides an output signal to set a flip-flop 318, the output of which, in turn, is applied to AND gate 312.

An output of AND gate 312 serves to provide an input signal to flip-flop 320, the output signal of which denotes the presence of correctly ordered telephone number data in shift register 300. Stage 24 is also coupled to a character detector 322 which provides an output signal to AND gate 316 which also receives an input signal N character detector 306. The output signal from gate 316 denotes an enter opportunity for the entry of data into shift register 300 and which is applied as an input to strobe logic 324. This strobe logic 324 also receives a control level from gate 270 (FIG. 12) and provides a strobe pulse for entry of a character stored in the data flip-flop (FIG. 12) into stage 23 of the shift register. A single strobe pulse is produced for each valid key actuation. The output from flip-flop 304 is applied to shift register control logic 326 which provides appropriate control of shift register 30 to provide data recirculation selectively from stage 23 or stage 24.

In certain instances when commencing dialer operation, an improper sequence of stored digits is present in shift register 300 and this data must be appropriately reordered for subsequent operations. For example, the interruption of a dial-out sequence during which data is being clocked out of the shift register to the outpulsing circuit for the dialing of a called number will cause data in the shift register to be in an improper sequence. The data must be reordered in order for proper redialing or recording of the stored telephone number to correctly be accomplished. Upon commencement of a redialing or recording mode, control logic 326 provides an appropriate command to the shift register to cause recirculation of data from stage 24 to stage 1 and corresponding shifting to data from stage 1 to stage 24 until an X marker is present in stage 24.

The presence of an X marker in stage 24 is sensed by detector 302 which provides upon such detection a signal to set flip-flop 304 to cause an output signal to control logic 326, which, in turn, is operative to provide a command to the shift register for recirculation of data from stage 23 to stage 1. Data is now recirculated from stage 23 to stage 1 and correspondingly from stage 1 toward stage 23 until an N character is detected in stage 23 by detector 306. The detection of an N character in stage 23 and an X character in stage 24 causes actuation via AND gate 310 of flip-flop 318. Data is continuing to be recirculated from stage 23 to stage 1 until detection in stage 23 of the first digit character (other than an N character) as sensed by detector 308.

Such detection of a digit character other than N in stage 23 signifies the presence of a correctly ordered telephone number in register 300, and upon detection, flip-flop 320 is set via a signal from AND gate 312 to provide an output signal denoting a correctly ordered number in the shift register. In the call mode, data is shifted from stage 23, while in the record mode, data is shifted from stage 24. In the call mode, the telephone number is serially shifted out of the shift register until an N character is detected in stage 23 by detector 306 and an X character is simultaneously detected in stage 24 by detector 302 which signifies the end of a stored number. In the record mode, the entire 96 bits of data is serially shifted from the shift register to the recording circuitry and recirculated in the register.

Thus, data entered into the shift register via the keyboard is read out for dialing of a called number or for recording on tape only if the number is correctly ordered within the shift register. It should be noted that when the dialer is employed for dialing from a number stored on tape, no reordering of data within the shift register is needed, since the data entered into the shift register from the tape is necessarily in correct sequence by reason of the entry of number data in proper order.

The shift register logic is operative to permit entry of new data, while previously stored data is being read out for dialing. Data in the shift register is in continuous recirculation through the register. A detector 322 detects the presence of any character, including the X marker but not the N null character, in stage 24 and upon such detection, provides an output signal to an AND gate 316. The presence of an N character in stage 23 causes detector 306 to provide an output signal to AND gate 316, while a third signal to gate 316 is provided by detector 314 upon sensing of an N character in stage 22. AND gate 316 therefore provides an output signal during the presence of predetermined input conditions in stages 22 through 24 of the shift register which denotes an enter opportunity; that is, a time when new data can be entered into the shift register. The enter opportunity signal is applied to strobe logic 324 as an enabling signal for the logic which also receives a keyboard signal and produces a single strobe pulse coincident with the $\phi_s$ clock for application to the enter flip-flop of stage 23 of the shift register for entry of a new character therein. The enter opportunity control signal is produced once during each cycle of the shift register which is typically 12 milliseconds.

Various modifications and alternative implementations of the invention will occur to those versed in the art without departing from the true scope of the invention. For example, a multiple counter logic technique can be employed in place of the recirculating shift register described above, wherein a counter determines the number of characters being transmitted while another counter determines the number of characters entered from a keyboard such that data can be sequentially entered into the shift register. Accordingly, it is not intended to limit the invention by what has been particularly shown and described, except as indicated in the appended claims.

What is claimed is:

1. A telephone dialer comprising:
   a magnetic tape transport including a magnetic tape for containing recorded data representative of telephone numbers and magnetic record-reproduction means operative to selectively record on or read from said tape;
   keyboard means for manual entry of telephone number data;
   an electronic temporary memory operative to store telephone number data derived from said magnetic tape or said keyboard means;
   control means operative to selectively cause transfer of telephone number data from said magnetic tape to said temporary memory and from said keyboard means to said temporary memory; and
   output circuit means operative in response to telephone number data stored in said temporary memory to provide telephone dialing signals for conveyance over a telephone line thereby to dial the telephone number represented by said stored telephone number data.

2. A telephone dialer according to claim 1 wherein said control means includes:
   record means operative to cause transfer of telephone number data from said keyboard means to said temporary memory and from said temporary memory to said magnetic record-reproduction means; and
   call means operative to cause transfer of telephone number data from said magnetic tape to said temporary memory and from said temporary memory to said output circuit means.

3. A telephone dialer according to claim 2 further including:
   a call progress monitor coupled to the output of said output circuit means for audible monitoring of telephone dialing signals being conveyed over a telephone line.

4. A telephone dialer according to claim 2 further including:
   a muting circuit operative to mute dialing signals during a selected interval of dialer operation.

5. A telephone dialer according to claim 2 wherein said output circuit means includes an outpulsing circuit for providing dialing pulses for conveyance over said telephone line.

6. A telephone dialer according to claim 2 wherein said output circuit means includes an outpulsing circuit for providing dialing signals for conveyance over said telephone line.

7. A telephone dialer according to claim 2 wherein said output circuit means includes a multi-tone dialing circuit for providing multi-tone dialing signals for conveyance over said telephone line.

8. A telephone dialer according to claim 2 wherein said temporary memory includes a multi-stage shift register for storing serial telephone number data, each stage of said shift register being operative to store a multi-bit character of said telephone number data.

9. A telephone dialer according to claim 2 wherein said temporary memory includes a multi-stage shift register for storing serial telephone number data, each character being stored in a respective stage.

10. A telephone dialer according to claim 9 wherein said control means includes:
shift register control logic for governing the entry and readout of data stored in said shift register; and
logic means for reordering the sequence of data stored in said shift register to provide an intended sequence of stored data representative of a telephone number.

11. A telephone dialer according to claim 10 wherein said shift register control logic includes logic means for providing for the entry of new telephone number data into said shift register while old telephone number data is being read out.

12. A telephone dialer according to claim 10 wherein said control means includes gate means operative to convey telephone number data from said shift register to said output means only upon detection of an intended sequence of stored data representative of a telephone number.

13. A telephone dialer according to claim 9 and wherein said control means includes shift register control logic comprising:
means coupled to a first selected stage of said shift register and operative upon detection of a first marker character to provide a first signal;
means coupled to a second selected stage of said shift register adjacent to said first stage and operative in response to detection of a second marker character to provide a second signal;
means coupled to said second stage of said shift register and operative in response to detection of the first character of stored telephone number data to provide a third signal;
means coupled to a third selected stage of said shift register adjacent to said second stage and operative in response to detection of said second marker character to provide a fourth signal;
first gate means operative in response to said first signal and said second signal in that order to provide a fifth signal; and
second gate means operative in response to said fifth signal and to said third signal in that order to provide an output signal indicative of correctly ordered telephone number data in said shift register.

14. A telephone dialer according to claim 13 wherein said shift register control logic further includes:
control circuitry for providing recirculation of data in said shift register from said first selected stage to the input stage of said shift register in response to the absence of said first signal and operative to provide recirculation of data in said shift register from said second selected stage to the input stage of said shift register in response to said first signal;
said control circuitry also being operative to discontinue recirculation of data in said shift register in response to receipt of said third signal subsequent to receipt of said fifth signal.

15. A telephone dialer according to claim 9 wherein said telephone number data is composed of a plurality of multiple-bit characters, each character representing a telephone number digit or special character and including a first marker character representative of the start of a data block containing said telephone number data and at least one second marker character representative of the end of said data block;
and wherein said control means includes logic circuitry for recognizing said data block.

16. A telephone dialer comprising:
a magnetic tape transport including a magnetic tape for containing data representative of telephone numbers and magnetic record-reproduction means operative to selectively record on or read from said tape;
keyboard means for manual entry of telephone number data;
circuit means for recognizing valid entry of telephone number data from said keyboard means;
an electronic temporary memory operative to store valid telephone number data entered by said keyboard means, and also operative to store telephone number data derived from said magnetic tape;
control circuitry including manually actuable control switches operative to selectively cause transfer of telephone number data from said magnetic tape to said temporary memory during a first mode of operation, and from said keyboard means to said temporary memory during a second mode of operation; and
output circuit means operative upon command to provide telephone dialing signals in response to telephone number data stored in said temporary memory.

17. A telephone dialer comprising:
a magnetic tape transport including a magnetic tape for containing data representative of telephone numbers and magnetic record-reproduction means operative to selectively record on or read from said tape;
manual entry means for entry of telephone number data;
control entry means for manual entry of control data;
encoding means coupled to said manual entry means and said control entry means for providing input data derived therefrom;
means for providing control data in response to said input data;
a plurality of data flip-flops for providing in response to said control data, multiple-bit characters representative of telephone number digits or control functions;
a plurality of control flip-flops for providing in response to said control data, a multiple-bit control character denoting that said multiple-bit characters from said data flip-flop represent control functions;
an electronic memory operative to store said multiple-bit characters representing the digits of a single telephone number;
control means operative to selectively cause transfer of said multiple-bit characters representing telephone number digits from said encoding means to said electronic memory and from said magnetic tape to said electronic memory; and
output circuit means operative to provide telephone dialing signals in response to said multiple-bit characters stored in said electronic memory.

18. A telephone dialer according to claim 17 wherein said encoding means includes circuit means for eliminating spurious input data and providing input data derived from said manual entry means and said control entry means only upon recognition of a valid data entry.

19. A telephone dialer according to claim 17 wherein said encoding means includes circuit means operative in response to said telephone number data and control data for providing said input data only upon recognition of a single data entry.

20. A telephone dialer according to claim 17 wherein said encoding means includes circuit means for providing said input data only upon recognition of a single data entry and including:
means providing codes representative of said telephone number data and control data; and
gate means operative to cause provision of said input data only in response to a code from said codes providing means derived from a single data entry.

21. A telephone dialer comprising:
a magnetic tape transport including a magnetic tape for containing data representative of telephone numbers and magnetic record-reproduction means operative to selectively record on or read from said tape;
manual entry means for entry of telephone number data;
control entry means for manual entry of control data;
encoding means coupled to said manual entry means and said control entry means for providing input data derived therefrom;
gate means for providing in response to said input data multiple-bit characters representative of telephone number digits or control functions;
gate means for providing in response to said input data a multiple-bit control character denoting that said multiple-bit characters from said gate means represent control functions;
an electronic memory operative to store said multiple-bit characters representing the digits of a single telephone number;
control means operative to selectively cause transfer of said multiple-bit characters representing telephone number digits from said encoding means to said electronic memory and from said magnetic tape to said electronic memory; and
output circuit means operative to provide telephone dialing signals in response to said multiple-bit characters stored in said electronic memory.

22. A telephone dialer comprising:
an elongated magnetic recording tape having a magnetic recording surface and an opposite visual writing surface, said tape being adapted for recording representations of telephone number data on said recording surface and visual representations on said visual writing surface;
a transport mechanism for said magnetic recording tape including a maually operable control knob for causing movement of said tape along the length thereof in either a forward or rearward direction;
a magnetic record-reproduction head disposed in operative association with the magnetic recording surface of said tape;
means defining a travel path generally transverse of said tape along which said magnetic head is movable in alignment with selected transverse positions on said recording surface;
a manually actuable mechanically operative mechanism coupled to said magnetic head and including a control button, the manual actuation of which causes controlled, substantially uniform velocity movement of said magnetic head relative to said magnetic recording surface;
keyboard means for manual entry of telephone number data;
an electronic memory operative to store telephone number data for a single telephone number selectively derived from said magnetic tape or said keyboard means;
control circuitry operative to cause, upon manual actuation of said control button, transfer of telephone number data from said magnetic tape to said electronic memory and operative to cause upon manual actuation of a second control button, transfer of telephone number data from said keyboard means to said electronic memory; and
output circuit means operative in response to telephone number data stored in said electronic memory to provide telephone dialing signals for conveyance over a telephone line.

* * * * *